March 30, 1965
O. W. SMITH
3,175,841
TRAILER SUSPENSION
Filed April 1, 1963
3 Sheets-Sheet 1
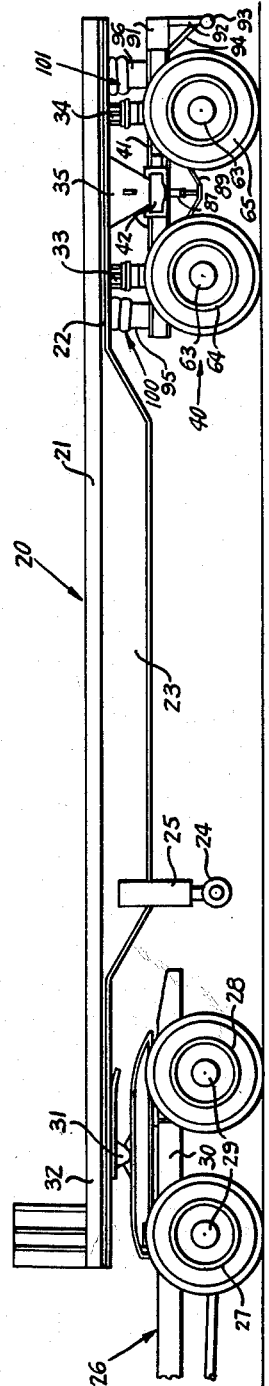
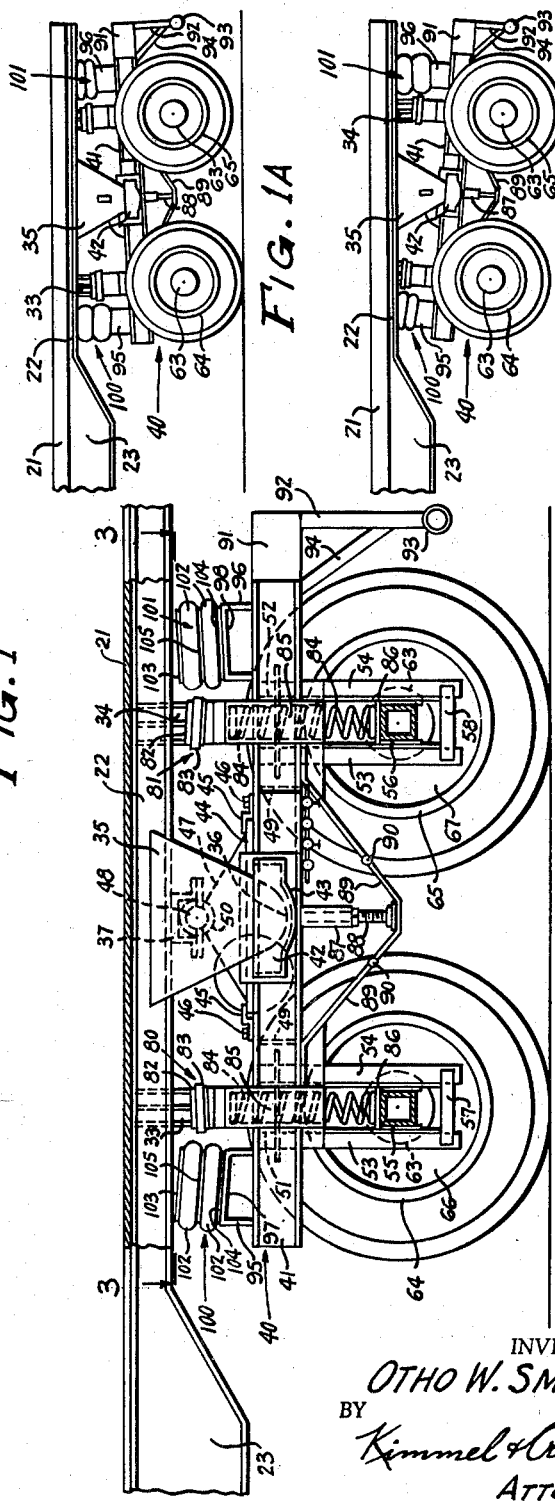
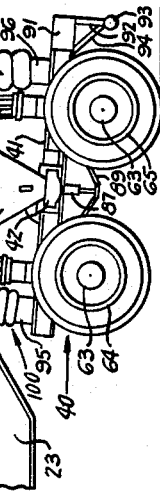
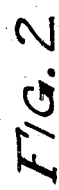
INVENTOR.
*OTHO W. SMITH*
BY
*Kimmel & Crowell*
ATTORNEYS.

March 30, 1965  O. W. SMITH  3,175,841
TRAILER SUSPENSION
Filed April 1, 1963  3 Sheets-Sheet 2
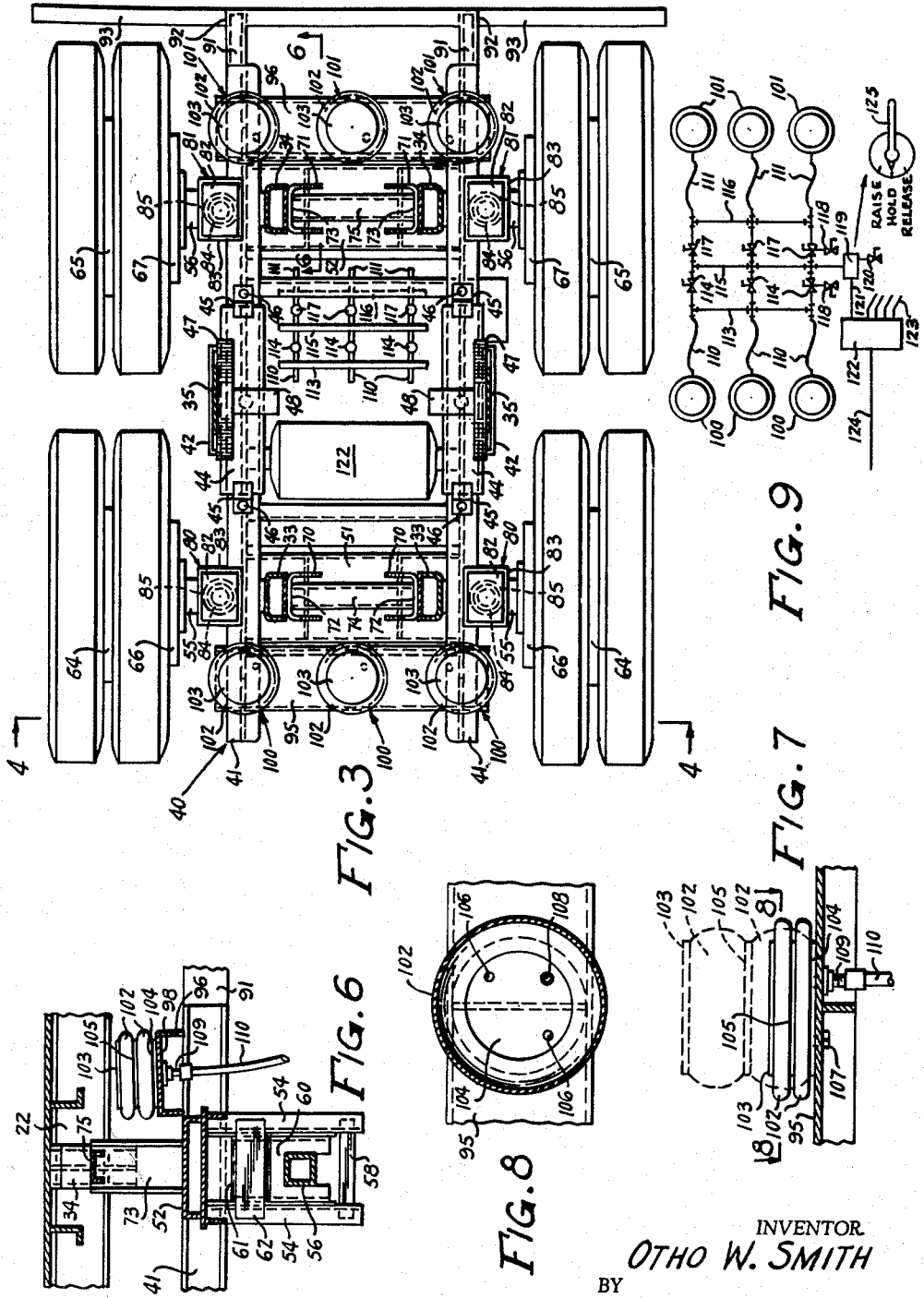
INVENTOR
OTHO W. SMITH
BY
Kimmel & Crowell
ATTORNEYS.

March 30, 1965 O. W. SMITH 3,175,841
TRAILER SUSPENSION
Filed April 1, 1963 3 Sheets-Sheet 3

INVENTOR.
OTHO W. SMITH
BY
Kimmel & Crowell
ATTORNEYS.

United States Patent Office 3,175,841
Patented Mar. 30, 1965

3,175,841
TRAILER SUSPENSION
Otho W. Smith, 33 Oolitic Road, Bedford, Ind.
Filed Apr. 1, 1963, Ser. No. 269,297
6 Claims. (Cl. 280—104.5)

This invention relates to trailer suspension and has particular applicability to a means for mounting and controlling the position of a multi-axle rear truck adapted to support, through multiple wheels carried thereby, the rear end of such a trailer, and characterized by means whereby the load carried by an individual axle or wheel may be readily adjusted.

A further important object of the invention is the provision of such a truck which is mounted on a transverse horizontal axis and characterized by means whereby the truck may be tilted so as to raise the axle or axles on either side of the pivot to a position where their wheels are out of contact with the ground. By this arrangement a saving may be effected, when the trailer is empty, of wear on certain of the tires, as well as a saving in tolls and taxes, which in certain areas are governed by the number of wheels contacting the ground.

A further object of the invention is the provision of a truck of this character provided with bumper means for limiting the tilt of the truck in either direction.

Still another object of the invention is the provision of such a truck provided with a plurality of pneumatic bellows type devices mounted between a bolster at either end thereof and the trailer bed, which may be inflated to effect the above-described tilting action.

A further object of the invention is the provision of means for individually controlling the inflation of each bellows so that, in addition to the primary function of tilting the truck about its pivotal axis, a load may be equalized, when the weight carried by the trailer, when loaded, is unevenly distributed.

Still another object of the invention is the provision of such a truck which is carried by a mounting which contacts the trailer at only a single point, so that the truck may be readily removed as a unit for repair, or other purposes.

A further object of the invention is the provision of an apparatus of this nature which is sturdy and durable in construction, reliable and efficient in operation, and relatively simple and inexpensive to manufacture, assemble, and utilize.

Still other objects reside in the combinations of elements, arrangements of parts, and features of construction, all as will be more fully pointed out hereinafter and disclosed in the accompanying drawings wherein there are shown preferred embodiments of this inventive concept.

In the drawings:

FIGURE 1 is a side elevational view of a trailer having its rear end supported by a truck constructed in accordance with the instant invention, the forward end of the trailer being shown as mounted on a portion of a tractor.

FIGURE 1A is a fragmentary view similar to the disclosure of FIGURE 1 showing the truck tilted to one position of adjustment.

FIGURE 1B is a view similar to FIGURE 1A but showing the truck oppositely tilted.

FIGURE 2 is an enlarged side view partially in elevation and partially in section showing certain operating mechanism associated with the truck.

FIGURE 3 is a top plan view of the truck on an enlarged scale, taken substantially along the line 3—3 of FIGURE 2, certain parts thereof being broken away.

FIGURE 6 is an enlarged sectional view taken substantially along the line 6—6 of FIGURE 3 as viewed in the direction indicated by the arrows.

FIGURE 7 is an enlarged elevation view, partially in elevation and partially in section, disclosing a constructional detail with an expanded position being shown in dashed lines.

FIGURE 8 is a sectional plan view taken substantially along the line 8—8 of FIGURE 7 as viewed in the direction indicated by the arrows.

FIGURE 9 is a schematic diagram showing the fluid line connections to several expansible bellows elements of the device and;

Similar reference characters refer to similar parts throughout the several views of the drawings.

Figure 5:
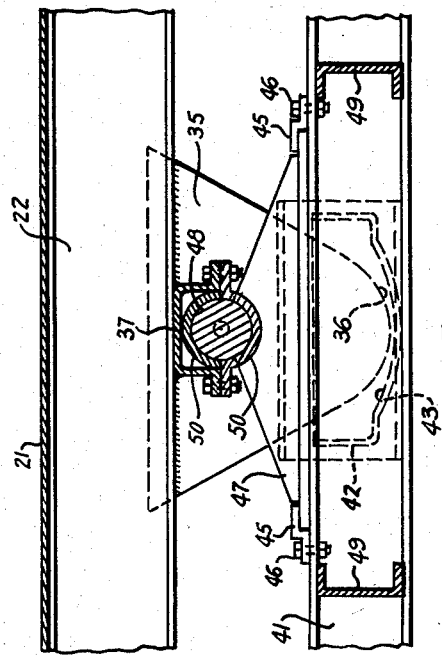
FIGURE 5 is an enlarged fragmentary side view partially in elevation and partially in section disclosing a constructional detail.

Having reference now to the drawings in detail, and more particularly to FIGURE 1, there is generally indicated at 20 a trailer, which illustratively, includes a flat bed 21 and longitudinally extending supporting beams 22. Reinforcing members 23 are positioned centrally of the trailer, and the usual retractable supporting wheels 24 with their associated supports 25 are provided. A fragment of a tractor vehicle is generally indicated at 26 and includes the usual tractor wheels 27 and 28 supported by drive axles 29 associated with a frame 30 which carries a conventional fifth wheel 31 to which the forward end 32 of the trailer body is attached in conventional manner.

Front and rear guide bars 33 and 34 are secured to the underside of the bed 21 adjacent the rear end of each trailer beam 22. Oppositely disposed hinge plates 35 depend from each beam 22 between guide bars 33 and 34 on opposite sides of the trailer bed, and terminate in curved radii 36, the purpose of which will be more fully described hereinafter. A channel-shaped housing 37 extends transversely beneath the beams 22 and is rigidly secured thereto centrally of the hinge plates.

One form of truck constructed in accordance with the instant invention is generally indicated at 40 and includes a pair of longitudinally extending beams 41, each of which carries on its outer side a hinge plate guide 42 having an arcuate bottom portion 43 into which the arcuate lower extremity 36 of the adjacent hinge plate 35 engages. Plates 44 are removably affixed to the top of each beam 41 by means of clamps 45 suitably secured by bolts 46 and hold triangular hinge pin supports 47 which carry at their apices hinge pins or stub axles 48. Transverse reinforcing members taking the form of channel irons 49 extend transversely between the beams 41 adjacent the opposite ends of support 47. These members 49 are at equal distances from the longitudinal center of beams 41, and they are therefore referred to in the claims as a balanced pair of transversely extending reinforcing members. Opposed flanged channel members 50 rigidly secured together and to the undersides of member 37 (by means not shown), hold hinge pins or stud axles 48 in related assembly with the trailer body in pivotal relation, so that the truck assembly 40 is pivotally supported on an axis extending through the center lines of the coaxial hinge pins 48. Since these coaxial connections together form the sole fixed connection between the trailer body and the truck 40, removal of bolts 46 and their associated clamps 45 permits ready and immediate disassembly of the entire truck from the vehicle for purposes of repair or replacement, as may be necessary. Unclamping the bearing about pin 48 accomplishes the same result.

Transverse horizontally extending supports 51 and 52 extend between front and rear ends of beams 41, respectively, and carrying depending opposed pairs of channel plates 53 and 54, respectively, which pairs in turn carry front and rear axle housings 55 and 56, respectively.

Figure 4:
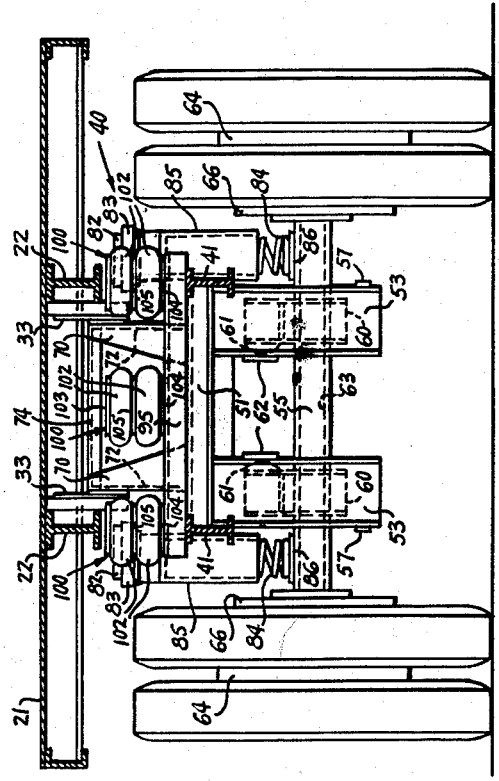
FIGURE 4 is a sectional view taken substantially along the line 4—4 of FIGURE 3 as viewed in the direction indicated by the arrows.

The axle housings are in turn secured to depending brackets 60 as best shown in FIGURES 4 and 6 which carry at their upper extremities guide bulbs 61 which are formed with arcuate faced plates which engage between wear plates 62 extending between the respective pairs of channels 53 and 54.

Axle housings 55 and 56 carry conventional front and rear axles 63 which in turn support dual front and rear wheels 64 and 65, respectively, and their associated brake mechanisms 66 and 67, respectively, the latter being of conventional design.

Front and rear flanged guide brackets 70 and 71, respectively, secured to supports 72 and 73, respectively, which in turn are mounted on transverse members 51 and 52 serve to direct guide plates 74 and 75 secured to the underside of the trailer body to prevent lateral disalignment of the trucks.

Front and rear tilt bumpers, generally indicated at 80 and 81, respectively, are provided on opposite sides of the truck aligned with the front and rear axle housings 55 and 56, respectively. Each tilt bumper comprises a rubber cushion 82 mounted on a metallic plate 83 which is inclined downwardly away from the center of the truck, the plates of the bumpers 80 and 81 being oppositely inclined. The plates are mounted on heavy duty compression springs 84, which are carried in sleeves 85 suitably affixed as by welding or the like to the longitudinal beams 41 on their outer sides. The lower end of each compression spring is seated on a wear plate 86 carried by the respective axle housing 55 or 56.

The impact of the bumpers against the undersides of the longitudinal beams 22 serves as a limit to the pivotal movement of the truck assembly about the hinge pins or stub shafts 48, either during normal travel of the vehicle, or when tilted in one direction or another in a manner to be more fully described hereinafter.

Hinge plate guide supporting beams are provided beneath each hinge plate guide and take the form of internally threaded sleeves 87 engaging bolts 88 which are supported by straps 89 connected at their opposite ends to the undersides of beams 41 and provided with transverse reinforcing rods 90.

The rear end of each truck may be provided with a bumper which is comprised of rearwardly extending supports 91 attached to each of the beams 41, from which depend supports 92 carrying bumper bars 93. Diagonal reinforcing supports 94 are also provided.

In order to effect tilting of the truck a front bolster 95 and a rear bolster 96 are provided extending transversely across the truck, as shown in FIGURE 2 adjacent the opposite ends thereof. Each bolster has a slightly inclined top face 97 and 98, respectively, which inclines downwardly toward the center of the truck or the hinge pin.

Bolsters or supporting brackets 95 and 96 carry, respectively, front and rear air bags 100 and 101. In the illustrative embodiment each bolster carries three such bags although more or less may be employed as desired. The bags 100 and 101 are identical in construction and each consists of two or more tubular sleevelike expansible rubber members 102 which are closed by top and bottom plates 103 and 104, respectively. An intermediate plate 105 is positioned between the two sleeves, and serves additionally to reinforce the air bag structure.

The bottom plate 104 is provided, as best shown in FIGURE 8, with a pair of openings 106 through which bolts 107 may be extended for the purpose of securing the plate and its associated air bag assembly securely to the bolster. A third opening 108 is also provided which accommodates a fitting 109 which is connected to an air line 110. Intermediate plate 105 is also provided with suitable openings to permit the passage of air between the sleeves 102, and, in the interest of manufacturing simplicity top plates 103 may also be provided with openings, which however, when the plates are used for top plates are suitably plugged.

As best shown in FIGURE 9, each air line 110 extends from an air bag 100 through an equalizing pipe 113 and an individual manual control valve 114 to a main air supply pipe 115. Rear lines 111 similarly lead from air bags 101 through an equalizer line 116 and individual manual valves 117 to main air supply line 115. Suitable bleeders 118 are provided on either side of the main supply line. A pressure gauge and control valve 119 provided with a bleeder 120 is positioned to the entrance of line 115 and communicates through a line 121 with the main air tank 122 for the brake lines 123. An air supply line extends to tank 122 from suitable conventional air pump (not shown). Valve 119 is provided with a handle 125 which is adjusted to three positions, raise, hold, and release, as indicated in FIGURE 9.

In the use and operation of the device when it is desired, for example, to raise rear wheels 65 from the ground as shown in FIGURE 1A, valves 117 are closed and valves 114 are opened, control handle 125 is moved to the raise position, and air under pressure enters the air bags 100 until they have expanded to the position shown in FIGURE 1A and the rear wheels are raised a suitable distance from the ground. The handle is then turned to hold, and the vehicle may travel in this position until the handle is moved to release, at which time pressure is released from the air bags 100, and the equalization of pressure permits the parts to return to the position shown in FIGURE 1.

Obviously, when it is desired to raise the front wheels 64, as shown in FIGURE 1B, the valves 114 are closed and valves 117 are opened, and the process is repeated until air bags 101 are suitably inflated to a degree sufficient to raise the front wheels 64 from the ground.

The equalizing pipes 113 and 116 permit equal distribution of air between the bags at either the front or rear end of the truck. Obviously, if individual control is desired for load balancing, suitable means (not shown) may be provided for closing either of the equalizing pipes as desired.

Figure 10:
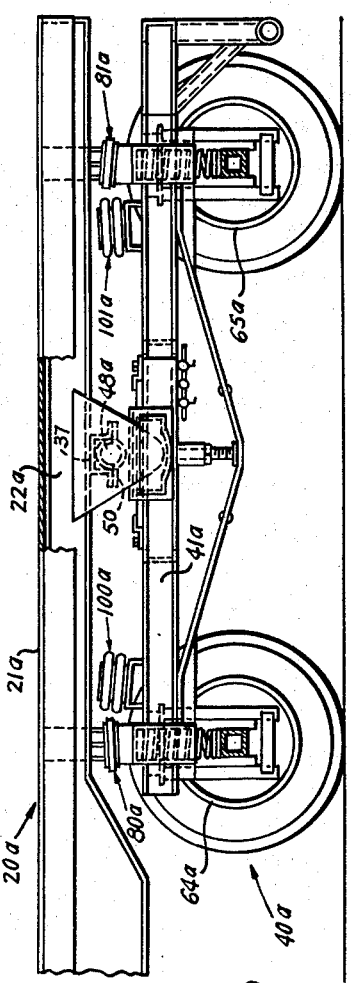
FIGURE 10 is a fragmentary side elevational view, partially in section, showing a modified form of construction.

FIGURE 10 discloses a slightly modified form of construction wherein a trailer body 20a includes a bed 21a and girders or beams 22a, substantially identical to that previously described, but longer and adapted to carry a heavier load. In this construction trucks 40a substantially identical to those previously described are employed and mounted on hinge pins or stub axles 48a in a manner identical to that previously described. In this modification, however, the air bags 100a and 101a instead of being positioned exteriorly of their associated tilt bumpers 80a and 81a are positioned interiorly thereof, permitting a greater extension of the beams 41a supporting the truck, and a consequent greater spacing of the front and rear wheels 64a and 65a. Except for the relative positioning of the air bags and the bumpers, and the relative length of the truck, the construction of the modified form is identical to that previously described.

From the foregoing it will now be seen that there is herein provided an improved means for truck suspension which accomplishes all the objects of this invention, and others, including many advantages of great practical utility and commercial importance.

It will be noted that the herein construction tends to eliminate torsional strains on the trailer frame. Also, the load on any axle, found to be different from that of the weight on any of the others can very readily be equalized.

when the load is on the scales. Small amounts of air will provide the desired adjustments. It will also be noted that there is hereby provided an auxiliary system so that even if not used, the suspension can revert to conventional.

As many embodiments may be made of this inventive concept, and as many modifications may be made in the embodiments hereinbefore shown and described, it is to be understood that all matter herein is to be interpreted merely as illustrative, and not in a limiting sense.

I claim:

1. In combination with a heavy duty vehicle trailer, a dual axle truck supporting the rear end of said trailer, wheels carried by such axle, means pivotally mounting said truck transversely across the trailer between the dual axles thereof, means for tilting said truck about said pivotal mounting means for selectively raising either of said dual axles to lift the associated wheels clear of the ground, said last-mentioned means including a bolster extending transversely across each end of said truck, expansible means positioned between each bolster and the underside of said trailer, controllable means for selectively expanding the expansible means positioned between each bolster and the underside of said trailer, controllable means for selectively expanding the expansible means carried by one or the other of said bolsters for tilting said truck, said expansible means comprising resilient air bag means on each bolster, pneumatic lines extending to each air bag means, and valve means for controlling each pneumatic line.

2. The structure of claim 1 wherein each bolster carries a plurality of individual air bags and an individual pneumatic line extends to each of said plurality of air bags and a load equalizing line connects the pneumatic lines leading to all of the air bags on such bolster.

3. The structure of claim 2 wherein each air bag comprises at least two expansible heavy duty rubber sleeve members coaxially mounted substantially vertically one above the other, an apertured metal plate mounted to and between each two of said sleeve members, an apertured metal plate mounted to and at each end of the air bag and projecting axially beyond each sleeve member, certain of the apertures in the lower plate accommodating mounting bolts, the latter secured through the adjacent bolster, another aperture in the lower plate accommodating a fitting connecting a pneumatic line to the interior of the air bag, the apertures in said plate mounted to and between each two of said sleeve members allowing passage of fluid between said members, and all the apertures in the top plate are plugged to prevent egress of fluid from the upper sleeve member.

4. The structure of claim 3 wherein the top surface of each bolster is inclined downwardly toward the center of the truck and the axes of the sleeve members are perpendicular to each respective top.

5. In combination with a heavy duty vehicle trailer, a dual axle truck including a rectangular frame made up of a pair of spaced apart longitudinal beam members and at least a balanced pair of transversely extending reinforcing members, wheels carried by each axle, means pivotally mounting said truck for selectively raising either of said axles, and including a pair of spaced apart vertical hinge plates, each longitudinally fixed to the underside of the trailer and extending downwardly below the top of the longitudinal beams, a pair of guides fixed to the outer sides of said longitudinal beams and closely overlapping the sides of the adjacent bottoms of said hinge plates, a pair of horizontal plates each removably attached to the top of a longitudinal beam and medially between said transversely extending reinforcing members, a pair of longitudinally extending vertical support members of triangular shape each individually affixed to said pair of plates, and transversely carrying at their upper vertices a first pair of opposed flange semicircular centered open top channel members, a pair of inverted channel members fixed to the bottom of the trailer and mating with said first channel to form thereby with said first channels two cylindrical bearings, a transverse stub shaft within each bearing and means to clamp said mating channel bearings together, whereby said truck may be readily removed as a unit either by removing the plates from the frame or unclamping the bearings about said stub shafts.

6. The structure of claim 5 and in addition front and rear pairs of bumpers including in combination, a pair of closed top vertical sleeves affixed to the outer side of each longitudinal beam and each vertically aligned with each axle, an axle housing around each axle, and a pair of wear plates on each axle and aligned with said sleeves, a heavy duty compression spring seated on each wear plate, the upper end of each spring carried within each sleeve, the top of each spring abutting the closed top of the cylinder, a metal plate and an overlying rubber cushion mounted upon the top of each sleeve, the top of the metal plates being inclined downwardly away from the center of the truck, whereby the pivotal movement of the truck assembly about the stub shafts and the tilting movement of the vehicle trailer is limited by impact of the cushions against the underside of the trailer body.

References Cited by the Examiner

UNITED STATES PATENTS

| 2,739,821 | 3/56 | Hickman | 280—104.5 |
| 2,749,140 | 6/56 | Hughes | 280—104.5 |

FOREIGN PATENTS

| 802,865 | 10/58 | Great Britain. |
| 921,250 | 12/54 | Germany. |

A. HARRY LEVY, *Primary Examiner.*